United States Patent [19]

Martin

[11] 4,408,017

[45] Oct. 4, 1983

[54] COUPLING PROCESS

[75] Inventor: Michael K. Martin, Houston, Tex.

[73] Assignee: Shell Oil Company, Houston, Tex.

[21] Appl. No.: 382,019

[22] Filed: May 26, 1982

[51] Int. Cl.³ .......................... C08F 8/00; C08F 8/18; C08F 297/04

[52] U.S. Cl. .................................. 525/288; 525/271; 556/465; 556/466

[58] Field of Search .................. 525/342, 332.8, 332.9, 525/333.1, 333.2, 288, 271

[56] References Cited

U.S. PATENT DOCUMENTS 3,880,954 4/1975 Kahle et al. .......................... 525/342
4,185,042 1/1980 Verkouw .............................. 525/342

Primary Examiner—Stanford M. Levin
Attorney, Agent, or Firm—Dean F. Vance; Peter A. Bielinski

[57] ABSTRACT

Lithium metal-terminated polymers of one or more alkadienes and of one or more monoalkenyl arenes are coupled by reaction with a coupling agent which has the general formula

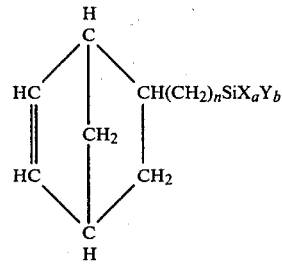

where X is hydrogen, halogen or an alkyl group and Y is halogen or an alkoxy group.

9 Claims, No Drawings

COUPLING PROCESS

BACKGROUND OF THE INVENTION

1. Field of the Invention

The invention relates to a process for coupling living polymers with a specific silane coupling agent.

2. Description of the Prior Art

The coupling of lithium metal-terminated polymers is a process known in the art. In accordance with this known process, a lithium metal-terminated polymer is treated with a compound having two or more functional groups containing two or more reactive sites capable of reacting with the carbon-lithium metal bonds of the lithium metal-terminated polymer. In many cases the multifunctional coupling agent thereby becomes a nucleus for the resulting structure. From this nucleus long chain polymeric branches radiate and such coupled polymers have specific properties that render them useful for particular applications.

Linear polymers are formed by employing coupling agents having two reactive sites. One type of coupling agent employed in forming linear polymers is a dihalo alkane such as dibromoethane. See G.B. Pat. No. 1,014,999. Another coupling agent employed in making linear polymers is phenyl benzoate as disclosed in U.S. Pat. No. 3,766,301. Radial polymers are formed by employing coupling agents having more than two reactive sites. Examples of such coupling agents include among others: $SiCl_4$—U.S. Pat. No. 3,244,664; Polyepoxides, polyisocyanates, polyimines, polyaldehydes, polyketones, polyanhydrides, polyesters, polyhalides—U.S. Pat. No. 3,281,383; Diesters—U.S. Pat. No. 3,594,452; Methoxy silanes—U.S. Pat. No. 3,880,954; Divinyl benzene—U.S. Pat. No. 3,985,830; 1,3,5-benzenetricarboxylic acid trichloride—U.S. Pat. No. 4,104,332; and glycidoxy-methoxy silanes—U.S. Pat. No. 4,185,042.

A new coupling agent has now been discovered that results in polymers having a site of unsaturation at the coupling agent residue which is available for further reaction or derivation.

SUMMARY OF THE INVENTION

The present invention broadly encompasses a process for the production of a polymer comprising reacting a living lithium-terminated polymer having the formula P-Li wherein P is selected from the group consisting of polymer chains of one or more alkadienes having 4–12 carbon atoms and copolymer chains of one or more alkadienes having 4–12 carbon atoms and one or more monoalkenyl arenes of 8–18 carbon atoms, having the alkenyl radical attached to an arene ring carbon atom, with a coupling agent, which agent has the general formula

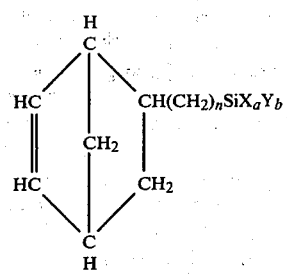

where "n" is 0 or an integer from 1 to 10, and where each "X" is selected from the group consisting of hydrogen, a halogen or an alkyl radical having from 1 to 10 carbon atoms, each "Y" is selected from the group consisting of a halogen and —OR where "R" is an alkyl group having from 1 to 10 carbon atoms, "a" is zero or an integer selected from the group consisting of 1 and 2, and "b" is an integer equal to 3 minus "a", and where the halogen is selected from the group consisting of chlorine, fluorine, bromine and iodine.

The coupling agents according to the present invention have a number of advantages. Specifically, coupling with the previous described coupling agents form star-branched polymers which contain reactive olefin bonds, which can be further utilized for polymer derivatization. The preferred coupling agents are: (bicycloheptenyl)methyldichlorosilane, bicycloheptenyl-2-trichlorosilane, and bicycloheptenyltriethoxysilane. Upon coupling through the reactive silicon-chlorine or silicon-alkoxy bonds, the reactive norbornene olefin double-bond is left for further reaction. This double-bond is ideal for copolymerization with $\alpha$-olefins through a Ziegler-Natta mechanism employing a vanadium halide, transition metal catalyst and alkyl aluminum cocatalyst. Likewise, high-activity titanium based transition metal catalysts with alkyl aluminum cocatalyst can be employed.

DETAILED DESCRIPTION OF THE INVENTION

The preferred group of acyclic conjugated alkadienes that can be polymerized into the polymer chain P are those containing 4–8 carbon atoms. Examples for such alkadienes are 1,3-butadiene, 2,3-dimethyl-1,3-butadiene, piperylene, 3-butyl-1,3-octadiene, isoprene, 2-phenyl-1,3-butadiene.

Monoalkenyl arenes that can be polymerized together with the alkadienes to form the polymer chain P preferably are those selected from the group of styrene, the methylstyrenes, particularly 3-methylstyrene, the propylstyrenes, particularly 4-propylstyrene, vinylnapthalene, particularly 1-vinylnapthalene, cyclohexylstyrenes, particularly 4-cyclohexylstyrene, p-tolylstyrene, and 1-vinyl-5-hexylnaphthalene.

The polymer chains P can be homopolymers of the alkadiene monomers defined or can be copolymers of alkadiene monomers and monoalkenyl-substituted aromatic monomers. These copolymers, in turn, can be random or tapered copolymers, as well as block copolymers of these various monomers. The presently preferred monomers are isoprene, 1,3-butadiene and styrene. The present preferred polymer chains P are those in which the conjugated dienes are present in a minor amount and the monovinyl-substituted arenes are present in a major amount.

The presently preferred polymer is one that is obtained by coupling a living lithium metal-terminated polymer selected from the group consisting of homopolymers of alkadienes having 4 to 12 carbon atoms and copolymers of at least one alkadiene of 4 to 12 carbon atoms.

The molecular weight of the polymers of this invention can vary in broad ranges. For the usual applications of the coupled polymers, the number average molecular weight will be in the range of about 6,000 to about 2,000,000.

Those polymers in which the polymer chain P has a structure A—B— so that B is attached to the coupling agent, and in which A represents a block of monoalkenylarenes, preferably a polystyrene block, and B represents a block that confers rubbery properties to the polymer chain, such as a polyalkadiene block, a copolymer block of an alkadiene and a monoalkenyl-substituted arene, or a combination of such blocks constitutes a presently preferred polymer. Such a polymer exhibits properties both of an elastomer and of a thermoplastic polymer. Therefore, such polymers can be formed into articles by standard procedures known for producing articles from thermoplastic polymers while the finished article exhibits elastomeric properties.

Furthermore, specific polymers constituting preferred embodiments of this invention are those obtained by reactions and procedures disclosed in detail in the following description of a process to make these polymers.

In accordance with another embodiment of this invention, there is provided a process for making the polymers defined above which comprises a coupling reaction between a living polymer having the formula P-Li and a coupling agent as defined above, wherein Li is lithium metal and P is as described above.

The quantity of coupling agent employed with respect to the quantity of living polymers P-Li present depends largely upon the degree of coupling and the properties of the coupled polymers desired. Preferably the coupling agent defined above will be employed in a range of about 4:1 to 1:4, preferably about 1:1 to about 1:3 moles of coupling agent based upon the moles of lithium metal present in the polymer.

As stated above, the coupling agent of the present invention has the general formula:

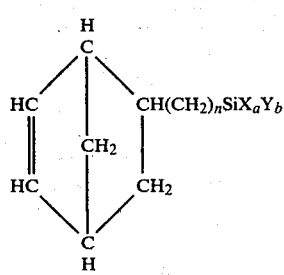

These coupling agents are prepared by contacting cyclopentadiene with a vinyl silane having the general formula $H_2C=CH(CH_2)_nSiX_aY_b$, where n is 0 or an integer from 1 to 10, and where each "X" is selected from the group consisting of hydrogen, a halogen or an alkyl radical having from 1 to 10 carbon atoms, each "Y" is selected from the group consisting of a halogen and —OR where "R" is an alkyl group having from 1 to 10 carbon atoms, "a" is zero or an integer selected from the group consisting of 1 and 2, and "b" is an integer equal to 3 minus "a", and where the halogen is selected from the group consisting of chlorine, fluorine, bromine and iodine.

Preferably, n is 0, the halogen is chlorine and R is an alkyl group having 1 or 2 carbon atoms. A preferred group of vinyl silanes includes vinyltrichlorosilane, vinyltriethoxysilane and methyldichlorovinylsilane. Accordingly, a preferred group of coupling agents includes bicycloheptenyl-2-trichlorosilane, bicycloheptenyltriethoxysilane, and (bicycloheptenyl)methyldichlorosilane.

The coupling agents are typically prepared by a Diels-Alder reaction whereby the vinylsilanes (e.g., vinyltrichlorosilane, vinylmethyldichlorosilane, and vinyltriethoxysilane) are reacted with cyclopentadiene to give the bicycloheptenylsilane derivatives. The reaction can be carried out using cyclopentadiene as the solvent under an argon or nitrogen blanket at temperatures between 20° C. and 100° C., and preferably between 30° C. and 70° C. A typical reaction is:

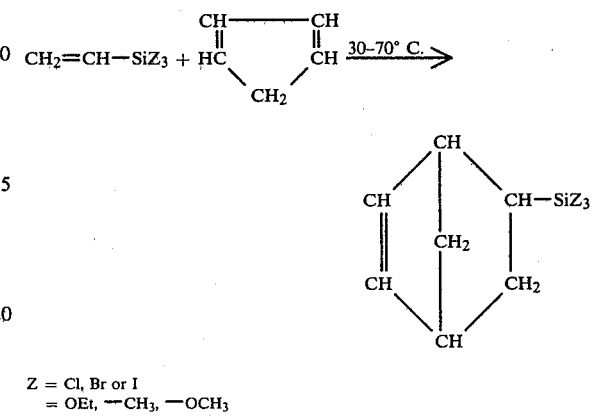

Z = Cl, Br or I
= OEt, —CH₃, —OCH₃

The reaction can also be achieved by refluxing with dicyclopentadiene whereby at the high reflux temperatures (160°–170° C.), dicyclopentadiene dissociates to form cyclopentadiene, which then adds to the desired vinylsilane. This procedure is most useful for the reaction with vinyltriethoxy silane which adds more slowly with cyclopentadiene than vinyltrichloro- or vinylmethyldichlorosilane.

The temperature at which the coupling reaction (i.e., the reaction between P-Li and the coupling agent) is carried out can vary over a broad range and, for convenience, often is the same as the temperature of polymerization. Although the temperature can vary broadly from about 0° to 150° C., it will preferably be within the range from about 20° to 100° C.

The coupling reaction is normally carried out by simply mixing the coupling agent, neat or in solution, with the living polymer solution. The reaction period is usually quite short. The normal duration of the coupling reaction will be in the range of 1 minute to 1 hour. Longer coupling periods may be required at lower temperatures.

After the coupling reaction, the coupled polymers are recovered by treating the reaction mixture with terminating agents containing active hydrogens such as alcohols or water or aqueous acid solutions or mixtures thereof. It is usually preferred to add an antioxidant to the reaction mixture before isolation of polymer.

The polymer is separated from the reaction mixture by standard techniques, such as steam stripping or coagulation with a suitable nonsolvent such as an alcohol. The coagulated or stripped polymer is then removed from the resulting medium by, e.g., centrifugation or extrusion. Residual solvent and other volatiles can be removed from the isolated polymer by heating, optionally under reduced pressure or in a forced air flow.

In accordance with a further embodiment of this invention, there is provided a process for producing the polymer as defined above. This process includes basically two steps. The first step is the step in which a living polymer having the formula P-Li is produced. The second step is that in which this living polymer is coupled with the coupling agent of this invention as defined above.

The first step of this process is carried out by reacting a mono-functional lithium metal initiator system with the respective monomer or monomers to form the living polymer chain P-Li. This polymerization step can be carried out in one step or in a sequence of steps. In the case where the polymer chain P is a homopolymer or a random or tapered copolymer of two or more monomers, the monomers are simultaneously polymerized with the lithium metal initiator. In the case where the polymer chain P is a block copolymer comprising two or more homo- or copolymer blocks, these individual blocks can be generated by incremental or sequential monomer addition.

The monomers that are generally employed, as well as the monomers that are preferably used have been defined above in connection with the novel polymers of this invention. These monomers are also preferred for the process of the present invention.

The lithium metal-based initiator systems used in the first step of the process to make the coupled polymers of this invention are based on lithium having the general formula R'Li wherein R' is a hydrocarbyl radical of 1 to about 20 carbon atoms. Examples of such lithium initiators are methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, and 4-cyclohexylbutyllithium. The amount of the lithium metal initiator employed depends upon the desired properties of the polymer, particularly the desired molecular weight. Normally, the organomonolithium initiator is employed in the range of about 0.1 to 100 gram millimoles per 100 grams of total monomers.

The polymerization reaction is carried out in the presence of a hydrocarbon diluent or solvent. Preferably the hydrocarbon diluent is a paraffinic, cycloparaffinic or aromatic hydrocarbon having 4–10 carbon atoms or a mixture of such diluents. Examples for the diluent are n-hexane, n-heptane, 2,2,4-trimethylpentane, cyclohexane, benzene and toluene. The reaction is generally carried out with a weight ratio of diluent to monomers exceeding 1. Preferably the diluent is employed in a quantity between about 400 to about 1500 parts by weight per 100 parts by weight of total monomers. In a preferred embodiment, a minor amount (0.1 to 10% by volume) of a polar compound is added to the diluent. Specific examples of polar compounds include dimethyl ether, diethyl ether, ethyl methyl ether, ethyl propyl ether, di-n-propyl ether, di-n-octyl ether, dibenzyl ether, diphenyl ether, anisole, tetramethylene oxide (tetrahydrofuran), 1,2-di-methoxyethane, dioxane, paraldehyde, dimethyl sulfide, diethyl sulfide, di-n-propylsulfide, di-n-butyl sulfide, methyl ethyl sulfide, dimethylethylamine, tri-n-propylamine, tri-n-butylamine, trimethylamine, triethylamine, N,N-dimethylamine, pyridine, quinoline, N-ethylpiperidine, N-methyl-N-ethylaniline, N-methylmorpholine, and the like. It is to be understood also that mixture of polar compounds can be employed in the practice of the instant invention. A preferred polar compound is diethylether. In the case where the polymer chain P is a homopolymer or a random or tapered copolymer of two or more monomers, the monomers are simultaneously polymerized with the dilithium metal initiator. In the case where the polymer chain P is a block copolymer comprising two or more homo- or copolymer blocks, these individual blocks can be generated by incremental or sequential monomer addition.

The polymerization reaction in step 1 usually occurs within a period of time ranging from a few minutes up to about 6 hours. Preferably, the reaction is carried out within a time period of about 10 minutes to about 2 hours. The polymerization temperature is not critical and will generally be in the range of about 15° to about 150° C., preferably in a range of about 40° to about 90° C.

At the conclusion of the polymerization in order to carry out the second or coupling step, the polymerization mixture is blended with the coupling agent. This is done before any material that would terminate the polymerization reaction and that would remove the lithium metal atom from the polymer chain is added to the reaction mixture. Thus the blending of the polymerization mixture and the coupling agent is carried out before any material such as water, acid or alcohol, is added to inactivate the living polymer. The second step of coupling the living polymer is thus carried out as described in detail above.

Various materials are known to be detrimental to the lithium metal-initiated polymerization. Particularly, the presence of carbon dioxide, oxygen, water and alcohols should be avoided during an organomonolithium-initiated polymerization reaction of step 1 of this combined process for making the coupled copolymers. Therefore, it is generally preferred that the reactants, initiators and the equipment be free of these materials and that the reaction is carried out under an inert gas such as nitrogen.

In a preferred embodiment, coupling efficiency is improved by (1) polymerization in the presence of a minor amount of a polar compound, such as an ether (2) slow incremental addition of the coupling agent to the monomer/solvent mixture and (3) where styrene polymer (P) chains are desired, it is preferable to add a few butadiene units to cap the polystyrene chains. By employing all three of the above techniques, it is possible to obtain coupling efficiencies above 85%.

The invention is further illustrated by reference to the following Illustrative Embodiments which are given for the purposes of illustration only, and are not meant to limit the invention to the particular reactant and conditions employed therein.

ILLUSTRATIVE EMBODIMENT I

In Illustrative Embodiment I, three different coupling agents were prepared using the following vinyl silanes: vinyltrichlorosilane, vinyltriethoxysilane and methyldichlorovinylsilane.

The coupling agents are prepared by a Diels-Alder cycloaddition reaction of the vinyl silanes with cyclopentadiene. Bicycloheptenyltrichlorosilane was prepared by reacting vinyltrichlorosilane (0.845 moles) with excess cyclopentadiene (50 grams) prepared by cracking dicyclopentadiene. The mixture was reacted at 70° C. for three hours. Fractional distillation of unreacted vinyltrichlorosilane and cyclopentadiene, followed by bicycloheptenyltrichlorosilane gave a 69% yield of bicycloheptenyltrichlorosilane (b.p. 108°–110° C., 35 mm Hg).

In a similar fashion, bicycloheptenylmethyldichlorosilane was prepared by heating methyldichlorovinyl silane (0.66 moles) with cyclopentadiene at 70° C. for 3–4 hours. Fractional distillation resulted in 0.3 moles of bicycloheptenylmethyl-dichlorosilane (45% yield) which was collected at 105°-106° C. at 35 mm of mercury.

The preparation of bicycloheptenyltriethoxysilane was prepared by refluxing 150 grams of dicyclopentadiene with 325 grams of vinyltriethoxysilane. The mixture was refluxed in a 1 liter flask for 16 hours at 180° C. Fractional distillation resulted in 180 grams (41% yield) of bicycloheptenyltriethoxysilane fraction distilled at 106°-108° C. (8 mm Hg).

ILLUSTRATIVE EMBODIMENT II

In Illustrative Embodiment II, polymers were prepared using the methyldichlorosilyl-norbornene and triethoxysilyl-norbornene coupling agents prepared in Illustrative Embodiment I.

One might anticipate that coupling polymer chains with methyldichlorosilyl-norbornene and triethoxysilyl-norbornene will be suppressed for steric reasons. Therefore, experiments were performed to evaluate the influence of the polymer chain end on coupling efficiency. A comparison was made between "living" polystyrene and polystyrene chains which had been end-capped with a few units of butadiene prior to the coupling step. Table 1 summarizes the reaction history and coupling efficiencies for polystyrene chain ends with both methyldichlorosilyl-norbornene and triethoxysilyl-norbornene respectively. As evidenced from Table 1, coupling efficiencies for polystyrene chain ends with either methyldichlorosilyl-norbornene or triethoxysilyl-norbornene are low, hence it appears that the steric hindrance associated with coupling is significant in this case.

Table 2 summarizes the data obtained for polystyrene chains to which have been added a few units of butadiene. As can be evidenced from Table 2, butadiene capping of polystyrene chain ends results in significant improvement in coupling efficiency. Likewise, it appears that coupling at 60°-70° C. is more efficient than at 50° C.

For the samples LR-160 and LR-172, which were coupled at 60° to 70° C., and GPC analysis indicate evidence of di- and tricoupled polymers, with total coupling efficiencies of 54% and 51%. For sample LR-172, an additional amount of coupling agent triethoxysilyl-norbornene was introduced at 70° C. after the initial 20-hour reaction period. The coupling efficiency in this case increased from 43% to 51% upon addition of triethoxysilyl-norbornene.

In summary, "living" homopolystyrene chain ends couple poorly with either coupling agents methyldichlorosilyl-norbornene or triethoxysilyl-norbornene. However, upon end-capping these chain ends with butadiene, significant improvements in coupling can be realized as both dicoupled and tricoupled polymer chains result as evidenced from GPC analysis.

TABLE 1

POLYSTYRENE COUPLING EFFICIENCIES[1]

| Sample | Coupling Agent | Reaction History | G.P.C. DATA Linear | G.P.C. DATA Coupled |
|---|---|---|---|---|
| LR-147 | Methyldichloro Silyl Norbornene | | | |
| (a) I | Methyldichloro Silyl Norbornene | Polystyrene Precursor | 91% | 9%[2] |
| (b) II | Methyldichloro Silyl Norbornene | Coupled for 2 hr., 50° C. | 93% | 7% |
| (c) III | Methyldichloro Silyl Norbornene | Coupled for 16 hr., 50° C. | 93% | 7% |
| LR-157 | Triethoxy Silyl Norbornene | | | |
| (a) I | Triethoxy Silyl Norbornene | Polystyrene Precursor | 92% | 8%[2] |
| (b) II | Triethoxy Silyl Norbornene | Coupled for 2 hr., 50° C. | 92% | 8% |
| (c) III | Triethoxy Silyl Norbornene | Coupled for 16 hr., 50° C. | 91.2% | 8.8% |

[1] All reactions achieved in cyclohexane.
[2] The 9% coupling most likely resulted from oxygen coupling upon sample isolation for G.P.C. Analysis.

TABLE 2

POLYBUTADIENE CAPPED ORGANOSILANE COUPLING EFFICIENCIES

| Sample | Coupling Agent[1] | Reaction History | G.P.C. DATA Linear | G.P.C. DATA Coupled |
|---|---|---|---|---|
| LR-151 | | | | |
| (a) I | (2) | Coupled 1 hr., 50° C. | 91% | 9% |
| (b) II | (2) | Coupled 1½ hr., 50° C. | 88.8% | 11.2% |
| (c) III | (2) | Coupled 16 hr. | 63% | 37% |
| LR-154 | | | | |
| (a) I | (3) | Coupled 1 hr., 50° C. | 84% | 16% |
| (b) II | (3) | Coupled 16 hr. | 68% | 32% |
| LR-160 | | | | |
| (a) I | (3) | Coupled 2 hr., 60° C. | 53.7% | 38.9%[4] 7.4 D |
| (b) II | (3) | + Additional 16 hr., 45° C. | 46% | 33.4 D 20.6 T |
| LR-172 | | | | |
| (a) I | (3) | Coupled 1 hr., 70° C. | 67% | 21.5% D 11.5% T |
| (b) II | (3) | Coupled 3 hr., 70° C. | 59.4% | 40.6% D & T |
| (c) III | (3) | + Additional 16 hr., 45° C. | 57% | 43% D & T |
| (d) IV | (3) | Add additional (3) + another 2 hrs. 70° C. coupling | 49% | 51% D & T |

[1] (2) = Methyldichlorosilyl Norbornene (ratio RLi/(2) = 2/1)
(3) = Triethoxysilyl Norbornene (ratio RLi/(3) = 3/1)
[4] D = Dicoupled
T = Tricoupled

ILLUSTRATIVE EMBODIMENT III

Illustrative Embodiment III shows the effect of coupling in the presence of diethyl ether as well as by incrementally adding coupling agent. Initial results indicate considerable enhanced coupling efficiencies when diethyl ether is present in the solvent. Likewise, higher coupling yields were observed when chlorosilane derivatives are employed versus alkoxy silane derivatives such as (2).

To further test these observations, trichlorosilyl-norbornene was investigated as a coupling agent. The goal was to establish optimum process conditions for coupling butadiene-capped poly(styrene) chain ends to form three-armed star polymers.

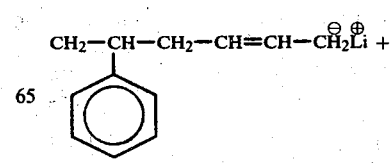

-continued

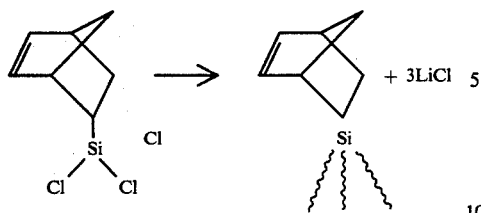

+ 3LiCl

Table 3 summarizes the coupling yields under different process conditions. It can be observed that the incremental addition of the coupling agent (3) results in coupling yields of 81.4 and 87%. It should be noted, however, that sample 15406-15, coupled in the presence of diethyl ether is essentially quantitatively coupled into a trifunctional star polymer. On the other hand, sample 15406-14, showing 87% coupling yield, was observed by G.P.C. Analysis to be 60% dicoupled. These results suggest that the ether modifier accelerates the reaction with coupling agent (3), as well as facilitating the attachment of the third polymeric arm onto the coupling agent.

In conclusion, incremental addition of trichlorosilyl norbornene to butadiene-capped poly(styrene) chain-ends in the presence of diethyl ether is the favored technique for maximizing coupling yield and tricoupled efficiency. In the presence of ethers the coupling reaction appears to be complete after 1 hour at 70° C.

TABLE 3
PROCESS VARIABLES WHILE COUPLING WITH TRICHLOROSILYL-NORBORNENE

| Sample | Procedure For Coupling Agent Addition[2] | Coupling Yield[1] |
|---|---|---|
| 15406-11 | No ether, fast addition | 78% = 70D + 8T |
| 15406-14 | No ether, incremental addition | 87% = 60D + 27T |
| 15406-15 | With ether, incremental addition | 81.4% T |
| 15406-17 | With ether, fast addition | 73% = 62D + 11T |

[1]D = Dicoupled polymer
T = Tricoupled polymer
[2]Reaction temperature 70° C.

What is claimed is:

1. A process for preparing a polymer comprising reacting a living lithium-terminated polymer having the formula P-Li wherein P is selected from the group consisting of polymer chains of one or more conjugated alkadienes having 4-12 carbon atoms and copolymer chains of one or more conjugated alkadienes having 4-12 carbon atoms and one or more monoalkenyl arenes of 8-18 carbon atoms, having the alkenyl radical attached to an arene ring carbon atom, with a coupling agent in a reaction zone, which agent has the general formula

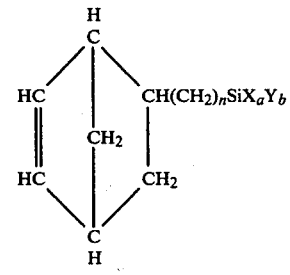

where n is 0 or an integer from 1 to 10, and where each "X" is selected from the group consisting of hydrogen, a halogen or an alkyl radical having from 1 to 10 carbon atoms, each "Y" is selected from the group consisting of a halogen and —OR where "R" is an alkyl group having from 1 to 10 carbon atoms, "a" is zero or an integer selected from the group consisting of 1 and 2, and "b" is an integer equal to 3 minus "a", and where the halogen is selected from the group consisting of chlorine, fluorine, bromine and iodine.

2. The process according to claim 1 where n is zero.

3. The process according to claim 2 wherein said coupling agent is selected from the group consisting of bicycloheptenyl-2-trichlorosilane, bicycloheptenyltriethoxysilane, and (bicyloheptenyl)methyldichlorosilane.

4. The process according to claim 3 wherein said coupling agent is bicycloheptenyl-2-trichlorosilane.

5. The process according to claim 1 wherein the monoalkenyl arene is styrene.

6. The process according to claim 1 where P-Li is a living polystyrene-polybutadiene-Li polymer.

7. The process according to claim 1 wherein said P-Li polymers are contacted with said coupling agent in the presence of a diluent and a minor amount of a polar compound.

8. The process according to claim 6 or claim 7 wherein said coupling agent is added incrementally to said reaction zone.

9. The polymer produced by the process of claim 1 or claim 3.

* * * * *